Sept. 5, 1939.  E. W. DENMAN  2,172,191
INDUCTION MOTOR PUNCHING
Filed Oct. 9, 1936
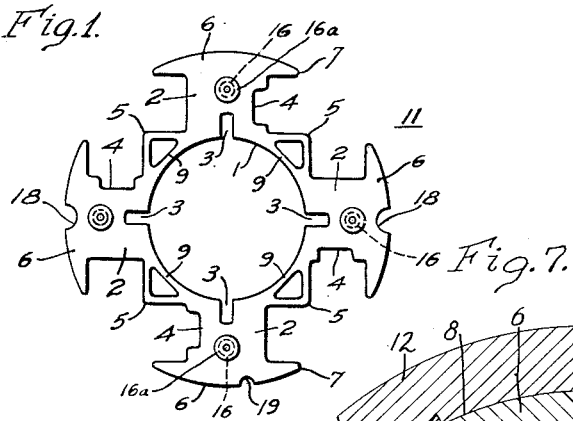
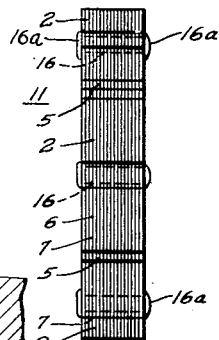
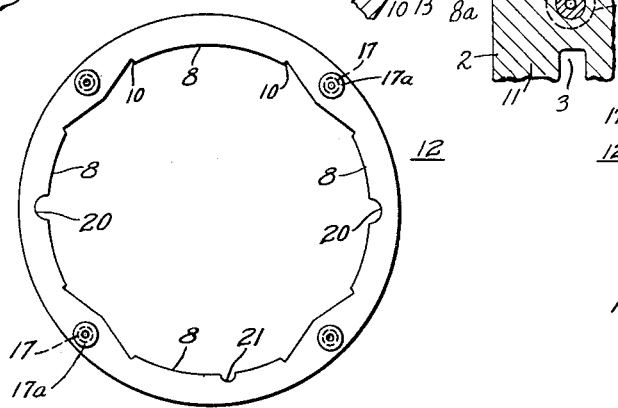
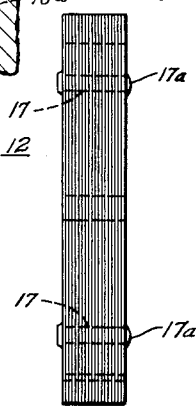
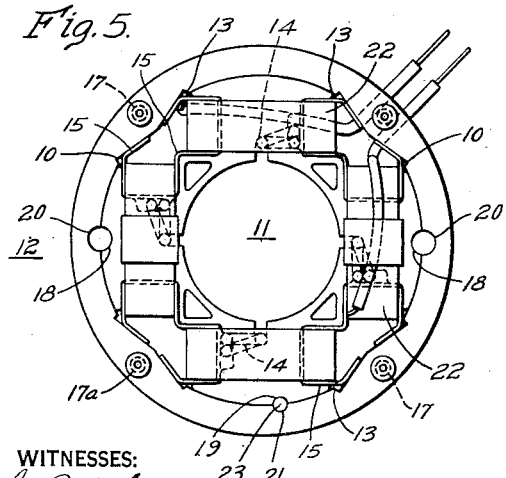
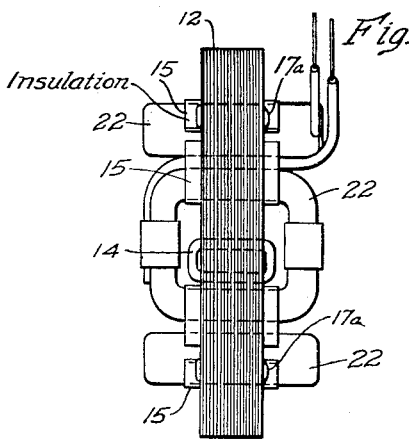
WITNESSES:
C. J. Weller.
Vm. C. Groome
INVENTOR
Earl W. Denman.
BY
W. R. Coley
ATTORNEY Patented Sept. 5, 1939

2,172,191

UNITED STATES PATENT OFFICE 2,172,191

INDUCTION MOTOR PUNCHING

Earl W. Denman, Longmeadow, Mass., assignor to Westinghouse Electric & Manufacturing Company, East Pittsburgh, Pa., a corporation of Pennsylvania Application October 9, 1936, Serial No. 104,821

18 Claims. (Cl. 171—252)

My invention relates to induction motors and more particularly to the laminations of the shaded pole type of induction motors.

In the development of shaded pole type punchings or laminations for induction motors, it has been found desirable to use a metal section between the pole tips, thus completely encircling the rotor. This has been done in the prior art by inserting metal pieces in notches or using special shapes to hold them in place. It is, therefore, an object of my invention to provide a lamination design having a solid section or bridge between the pole tips, thus completely encircling the rotor, the bridge being designed in such a manner as to strengthen the whole structure, but not to reduce the total useful flux.

A further object of my invention is to design the bridge so that it may be used as one end of a bobbin for winding the coils on the pole piece after it has been built up into cores.

A further object of my invention is to design the pole tip so that it forms one end of a bobbin, when the laminations are built up into cores, upon which the field coils may be wound.

A further object of my invention is to design the pole tips in such a manner as to avoid sharp edges, thus eliminating the possibility of burrs and the need of expensive tool upkeep.

A further object of my invention is to use a single piece of insulation to insulate one-half of each of two adjacent coils from the core.

Other objects of my invention will become apparent or will be specifically pointed out in the following description of a preferred form of my invention, taken in conjunction with the accompanying drawing, in which:

Figure 1 is a plan view of a lamination or punching embodying my pole and bridge structure;

Fig. 2 is a side view of an assembled pole and bridge core structure;

Fig. 3 is a plan view of the cooperating yoke structure;

Fig. 4 is a side view of an assembled yoke core structure;

Fig. 5 is a plan view of the assembled core showing the windings and shading coils placed thereon, Fig. 6 is a side view of the structure shown in Fig. 5; and Fig. 7 is an enlarged fragmentary view of the top polar projection embodying my invention.

Referring to Fig. 1, I have illustrated a pole punching 11 having therein a large opening 1 in its center portion, for receiving the rotor of the motor, and a plurality of poles 2 having a head portion 6 integral therewith. A slot 3 is punched at the inner periphery of each pole, somewhat off-center, and an undercut section 4 is provided at one side of each pole, substantially as shown, for purposes to be hereinafter set forth. Bridges 5, 9 are placed between the poles, their shape being that of a hollow triangle with the outer leg members or sections 5 thereof at right angles to the adjacent poles, and the remaining legs or main sections 9 constituting portions of the material immediately enclosing central opening 1. Each head portion 6 has its inner edge 8a at substantially right angles to the axis of the pole, (see Fig. 7), while its outer edge 8 may be in the form of an arch substantially as shown. It will be observed that the head portions 6 do not terminate in a point, but end at a line 7, which is approximately radial to the arcuate surface 8 of the head portion, as shown in Fig. 7.

As shown in Fig. 1, the poles 2 and bridges 5, 9 completely encircle the rotor. The exact ratio of the cross-sectional area between sections 5 and 9 is determined by experimentation, both as to reluctance and mechanical strength. If a single section such as the main section 9 were used having sufficient width to make a good mechanical construction, it would, after being assembled into a laminated core structure, be too heavy to give the proper electrical effects. A large cross-sectional area will allow too high a quantity of flux to pass between the poles, thus decreasing the torque of the motor as this flux would not be forced down into the rotor. By making section 9 of two right-angle portions (as shown in Fig. 1), I have increased the strength of the section and also have provided a means for increasing, in effect, the total cross-section of the metal used, while at the same time the long path around the right-angle portions has the effect of increasing the reluctance and of cutting down the total flux bypassed.

It will be observed that the inner boundary 8a of each head portion 6 is substantially parallel to the adjacent bridge section 5 and, therefore, substantially at right angles to the pole 2. Accordingly, the right-angle bridge portion 5 may form one end support of a bobbin for winding the coils directly on the pole piece, while the right-angle boundary 8a of the head portion may form the other end support of such a bobbin. By winding the coils directly on the pole pieces, it will be possible to allow the use of one continuous wire for making all the coils, as the winding machine only requires reversal of its rotation for winding alternate poles.

It is to be noted that the pole punching 11, as shown in Fig. 1, was originally joined to yoke punching 12, as shown in Fig. 3, the unwanted material having been punched out in one operation. This combined punching is illustrated in Fig. 5. It will be observed that offset 10 of yoke 12 (see Fig. 3) and the linear pole tip 7 of the head portions 6 of pole punching 11 (see Fig. 1 and Fig. 7) form a straight line nearly radial in direction, as shown at 13 in Fig. 5, which allows the punch that forms the curved portion 8 of head portion 6 at the same time to cut practically at right angles to the edge of the material. This has great advantages with tool operation in that it avoids sharp edges which cause burrs and expensive tool upkeep.

A shading coil 14 may be inserted in inner peripheral slot 3 and undercut section 4 in each pole piece and wound around the corresponding section of each pole 2, as shown in Fig. 5. The shading coil is preferably made of copper and lapped in the undercut section 4 and soldered, thus leaving a relatively flat and smooth outer surface on the pole 2 for winding purposes.

Referring to Fig. 5, I show an insulation strip 15 which is used to insulate each of the confronting portions of the two adjacent polar projections of the core. This insulation, preferably of mica, extends along the inner edge 8a of the head portion or the outer end of each bobbin, the inside of the coil, and the bridge end 5 of the bobbin, then proceeds to the next pole insulating the bridge, pole, and head portion respectively. The ends of this insulating material are then placed along the inside of the yoke forming an additional protection for the coils. Only four strips of insulation, so placed, thus provide the necessary coil to core insulation for the entire motor.

In building the motor, a desired number of pole punchings or laminations 11 are selected and riveted together. The rivets 16a are placed through holes 16 in the poles 2. A shading coil 14 is then placed in slot 3 and undercut section 4 in each pole where it is lapped in. The insulating strips 15 are then put in place and the coils 22 are wound directly on the poles. Likewise, a desired number of yoke punchings 12 are selected and riveted together. The rivets 17a are placed through holes 17 in the yoke. The pole structure with its associated windings is then pressed into the yoke structure producing a finished winding and core structure substantially as shown in Figs. 5 and 6. The interfitting structures are so assembled that two semi-circular undercut openings 18 and a smaller opening 19 on the outer edges of pole punchings 11 respectively coincide with two semi-circular undercut openings 20 and a smaller opening 21 on the inner edge of yoke 12 to form circular holes, as shown in Fig. 5. A pin 23, inserted in hole 19, 21, may be used to prevent the pole structure from turning within the yoke structure. Holes 18, 20 may be used as bolt holes for fastening the completed core structure to the motor frame.

Various modifications may be made in my invention without departing from the spirit and scope thereof, and I desire, therefore, that only such limitations shall be placed thereon as are imposed by the prior art or specifically set forth in the appended claims.

I claim as my invention:

1. A motor lamination punching having a plurality of radially outwardly extending polar projections and a central aperture, and means comprising integral metallic bridges bounding said aperture and additional metallic bridges for connecting the respective pairs of adjacent polar projections, said metallic bridges between each pair of said pairs of projections severally comprising a plurality of separated portions integral at their ends only.

2. A motor lamination punching having a plurality of polar projections, and means comprising metallic bridges for connecting the respective pairs of adjacent polar projections, said metallic bridges severally comprising two portions, one of which assumes substantially the shortest direct path between the said poles, the other being approximately at right angles to each of two adjacent poles.

3. A motor lamination punching having a plurality of polar projections, and means comprising metallic bridges for connecting the respective pairs of adjacent polar projections, said metallic bridges severally comprising two portions, one of which assumes substantially the shortest direct path between the said poles, the other forming an inverted V in reference to the center of said punching.

4. A motor lamination punching having a plurality of polar projections, and means comprising metallic bridges for connecting the respective pairs of adjacent polar projections, said metallic bridges severally comprising two portions, one of which assumes substantially the shortest direct path between the said poles, the other forming an inverted V in reference to the center of said punching and being approximately at right angles to each of two adjacent poles, the right angle portions thereof adapted to act as end supports for field coils to be wound upon the polar projections.

5. In combination with a motor field core comprising a plurality of superimposed yoke punchings and a plurality of superimposed pole punchings having a plurality of polar projections including a head portion, said polar projections being joined at their inner ends by a bridge section, a strip of insulating material insulating confronting portions below said head portions of each of two adjacent polar projections and the lower portions of said head portions.

6. A motor field assembly comprising a laminated yoke structure comprising a plurality of superimposed punchings fastened together in juxtaposition, a laminated unit pole structure comprising a plurality of superimposed punchings fastened together in juxtaposition, means comprising metallic bridges for connecting the respective pairs of adjacent poles, said bridges constituting an integral part of said pole structure and comprising a plurality of portions, one of which assumes the shortest permissible path between adjacent poles, the other having members at approximately right angles to each of two adjacent poles, and means comprising a strip of insulating material for insulating approximately one-half of each of two adjacent poles.

7. A motor field assembly comprising a laminated yoke structure comprising a plurality of superimposed punchings fastened together in juxtaposition, a laminated unit pole structure comprising a plurality of superimposed punchings fastened together in juxtaposition, said pole structure having head portions extending substantially perpendicular to said poles, the outer boundary of said head portions being curved, so that the head portion becomes substantially a segment of a circle, means comprising apertured metallic bridges for connecting the respective pairs of adjacent polar projections, said bridges constituting an integral part of said pole structure and comprising a plurality of portions, one of which assumes the shortest permissible path between adjacent pole tips, the other having members at approximately right angles to each of two adjacent pole tips, means comprising a strip of insulating material for insulating the confronting portions of each of two adjacent poles, and means comprising the right angle bridge portions and the overlapping head portions adapted to act as end supports upon which the field coils may be wound.

8. A motor field assembly comprising a laminated yoke structure comprising a plurality of superimposed punchings fastened together in juxtaposition, a laminated unit pole structure comprising a plurality of superimposed punchings fastened together in juxtaposition, said pole structure having head portions extending substantially perpendicular to said poles, the outer boundary of said head portions being curved, so that the head portion proper becomes substantially a segment of a circle, the ends thereof terminating in short lines which are nearly radial to the curved edge thereof, means comprising apertured metallic bridges for connecting the respective pairs of adjacent polar projections, said bridges constituting an integral part of said pole structure and comprising a plurality of portions, one of which assumes the shortest permissible path between adjacent pole tips, the other having members at approximately right angles to each of two adjacent pole tips, means comprising a strip of insulating material for insulating the confronting portions of each of two adjacent poles, and means comprising the right angle bridge portions and the overlapping head portions adapted to act as end supports upon which the field coils may be wound, said pole structure located within said yoke structure to form a unit field structure with the linear ends of said head portons coinciding with the radial sides of indentations cut within the inner periphery of the yoke, in such a manner as to form a continuous unbroken line.

9. A motor field core comprising a plurality of superimposed yoke punchings and a plurality of superimposed pole punchings having a plurality of polar projections, each of said projections including an outer head portion extending from both sides, said polar projections being joined at their inner ends by a bridge section.

10. A motor field core comprising a plurality of superimposed yoke punchings and a plurality of superimposed pole punchings having a plurality of polar projections, said polar projections joined at their inner ends by a bridge section, and a strip of insulating material insulating confronting portions of each of two adjacent polar projections.

11. A motor lamination punching having a plurality of polar projections including head portions, said head portions being adapted to constitute end supports of bobbins, and having their inner boundary substantially at right angles to the axis of the corresponding polar projection and their outer boundary curved so that each head portion becomes substantially a segment of a circle, the ends thereof terminating in short lines which are substantially radial to the curved edge thereof.

12. A motor lamination punching having a plurality of polar projections with sides extending from each side of each of said projections including head portions, means comprising apertured metallic bridges for connecting the respective pairs of adjacent polar projections, said head portions being adapted to constitute end supports of bobbins, and having their outer boundary curved so that each head portion becomes substantially a segment of a circle.

13. A motor lamination punching having a plurality of polar projections including head portions, means comprising apertured metallic bridges for connecting the respective pairs of adjacent polar projections, said head portions being adapted to constitute end supports of bobbins, and having their outer boundary curved so that each head portion becomes substantially a segment of a circle, the ends thereof terminating in short lines which are substantially radial to the curved portion thereof.

14. A motor lamination punching having a plurality of polar projections including head portions, means comprising apertured metallic bridges for connecting the respective pairs of adjacent polar projections, said head portions and bridges being adapted to constitute end supports of bobbins, and having their inner boundary substantially at right angles to the axis of the corresponding polar projection and said head portions having their outer boundary curved so that each head portion becomes substantially a segment of a circle.

15. A motor lamination punching having a plurality of polar projections including head portions, means comprising apertured metallic bridges for connecting the respective pairs of adjacent polar projections, said head portions being adapted to constitute end supports of bobbins, and having their inner boundary substantially at right angles to the axis of the corresponding polar projection and their outer boundary curved so that each head portion becomes substantially a segment of a circle, the ends thereof terminating in short lines which are nearly radial to the curved edge thereof.

16. A motor lamination punching having a plurality of radially outwardly-extending polar projections and a central aperture, a plurality of relatively narrow bridging members, one for each two adjacent of said projections and between them and defining a part of said aperture, and a plurality of reinforcing members, one for each two adjacent of said projections and between them whereby each of said bridging members is paired with one of said reinforcing members, the ends of each reinforcing member being integral with its paired bridging member but spaced therefrom between said ends.

17. A motor lamination punching having a plurality of radially outwardly-extending polar projections and a central aperture, a plurality of relatively narrow bridging members, one for each two adjacent of said projections and between them and defining a part of said aperture, and a plurality of reinforcing members, one for each two adjacent of said projections and between them whereby each of said bridging members is paired with one of said reinforcing members, the ends of each reinforcing member being integral with its paired bridging member but spaced therefrom between said ends and of greater magnetic reluctance.

18. A motor lamination punching primarily for a shaded-pole motor, said punching having a plurality of radially outwardly-extending polar projections and a central aperture; a plurality of bridging members, one for each two adjacent of said projections and between them and defining part of said aperture; said projections having a body portion and a head portion at the end away from said aperture, said head portion having tips extending outwardly from said body portion; contiguous sides of one of said tips, said body portion, and one of said bridge members being so formed as to define a channel having substantially right angle corners whereby when a plurality of laminations are in an assembly for ultimate application in the motor, bobbins can be wound directly on the poles formed by the polar projections, the said channel acting, in effect, as a winding form.

EARL W. DENMAN.